US010459840B2

(12) United States Patent
Kilari et al.

(10) Patent No.: US 10,459,840 B2
(45) Date of Patent: Oct. 29, 2019

(54) METHODS AND DEVICES FOR REDUCING COMPRESSED PAGE LOADING TIME ON PAGE FAULT

(75) Inventors: Vijaya Kumar Kilari, Bangalore (IN); Saugata Das Purkayastha, Bangalore (IN)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 1856 days.

(21) Appl. No.: 13/879,122

(22) PCT Filed: Oct. 12, 2011

(86) PCT No.: PCT/EP2011/067826
§ 371 (c)(1),
(2), (4) Date: Aug. 22, 2013

(87) PCT Pub. No.: WO2012/052336
PCT Pub. Date: Apr. 26, 2012

(65) Prior Publication Data
US 2013/0326170 A1 Dec. 5, 2013

(30) Foreign Application Priority Data
Oct. 22, 2010 (IN) .......................... 2533/DEL/2010

(51) Int. Cl.
*G06F 12/08* (2016.01)
*G06F 12/02* (2006.01)
(Continued)

(52) U.S. Cl.
CPC ............ *G06F 12/08* (2013.01); *G06F 3/0608* (2013.01); *G06F 3/0638* (2013.01);
(Continued)

(58) Field of Classification Search
None
See application file for complete search history.

(56) References Cited

U.S. PATENT DOCUMENTS 6,023,761 A 2/2000 Ott
7,095,343 B2 * 8/2006 Xie .......................... H03M 7/30
341/106

(Continued)

FOREIGN PATENT DOCUMENTS

CN 1484151 A 3/2004
CN 101714076 A 5/2010
(Continued)

OTHER PUBLICATIONS

International Search Report issued in corresponding International application No. PCT/EP2011/067826, dated May 23, 2012.
(Continued)

*Primary Examiner* — Reginald G Bragdon
*Assistant Examiner* — Kimbleann C Verdi
(74) *Attorney, Agent, or Firm* — Leffler Intellectual Property Law, PLLC

(57) ABSTRACT

Exemplary embodiments provide for compressing, storing, retrieving and decompressing paged code from mass storage devices. By evaluating the size of compressed virtual pages relative to the storage page (read unit) of the mass storage device into which the compressed virtual pages are to be stored, decisions can be made which facilitate later read out and decompression of those compressed virtual pages. According to exemplary embodiments, a virtual page can be stored uncompressed, compressed but undivided or compressed and subdivided into a plurality of parts based on an evaluation.

16 Claims, 10 Drawing Sheets

(51) Int. Cl.
  *G11B 20/00* (2006.01)
  *G11B 20/12* (2006.01)
  *G06F 3/06* (2006.01)

(52) U.S. Cl.
  CPC ........ *G06F 3/0679* (2013.01); *G06F 12/0246* (2013.01); *G11B 20/00007* (2013.01); *G11B 20/12* (2013.01); *G06F 2212/401* (2013.01); *G06F 2212/7203* (2013.01); *G11B 2020/1288* (2013.01)

(56) References Cited

U.S. PATENT DOCUMENTS

2009/0138655 A1    5/2009   Cho
2010/0017578 A1*  1/2010   Mansson ............... G06F 12/023
                                                          711/171

FOREIGN PATENT DOCUMENTS

| EP | 2 175 363 A1 | 4/2010 |
| EP | 2175363 A1 | 4/2010 |
| EP | 2 200 029 A1 | 6/2010 |
| EP | 2200029 A1 * | 6/2010 ....... G11B 20/00007 |
| EP | 2200029 A1 | 6/2010 |

OTHER PUBLICATIONS

Chinese Office Action dated Apr. 23, 2015 in connection with Chinese Application No. 201180051017.4, 11 pages.

PCT International Preliminary Report on Patentability, dated Apr. 23, 2013, in connection with International Application No. PCT/EP2011/067826, all pages.

PCT International Search Report, dated May 23, 2012, in connection with International Application No. PCT/EP2011/067826, all pages.

PCT Written Opinion, dated May 23, 2012, in connection with International Application No. PCT/EP2011/067826, all pages.

* cited by examiner

| | | |
|---|---|---|
| 0x00000004 | NUMBER OF MMU PAGES | |
| 0x00001000 | PAGE 1 STARTS AT ADDRESS 0x1000 (OFFSET OF CHUNK 1) | |
| 0x00001000 | PAGE 1 IS OF SIZE 0x1000 I.E NOT COMPRESSED (SIZE OF CHUNK 1) | |
| 0x00001000 | PAGE 1 STARTS AT ADDRESS 0x1000 (OFFSET OF CHUNK 2) | |
| 0x00001000 | PAGE 1 IS OF SIZE 0x1000 I.E NOT COMPRESSED (SIZE OF CHUNK 2) | |
| 0x00002800 | PAGE 2 STARTS AT ADDRESS 0x2800 (OFFSET OF CHUNK 1) | |
| 0x00000600 | PAGE 2 IS OF SIZE 0x600 I.E COMPRESSED (SIZE OF CHUNK 1) | |
| 0x00002800 | PAGE 2 STARTS AT ADDRESS 0x2800 (OFFSET OF CHUNK 2) | |
| 0x00000600 | PAGE 2 IS OF SIZE 0x600 I.E COMPRESSED (SIZE OF CHUNK 2) | |
| 0x00002000 | PAGE 3 STARTS AT ADDRESS 0x2000 (OFFSET OF CHUNK 1) | |
| 0x00000800 | PAGE 3 IS OF SIZE 0x800 COMPRESSED (SIZE OF CHUNK 1) | |
| 0x00002000 | PAGE 3 STARTS AT ADDRESS 0x2000 (OFFSET OF CHUNK 2) | |
| 0x00000800 | PAGE 3 IS OF SIZE 0x800 I.E COMPPRESSED (SIZE OF CHUNK 2) | |
| 0x00002E00 | PAGE 4 STARTS AT ADDRESS 0x2E00 (OFFSET OF CHUNK 1) | |
| 0x00000200 | PAGE 4 IS OF SIZE 0x200 I.E COMPRESSED (SIZE OF CHUNK 1) | |
| 0x00003000 | PAGE 4 STARTS AT ADDRESS 0x3000 (OFFSET OF CHUNK 2) | |
| 0x00000800 | PAGE 4 IS OF SIZE 0x800 I.E COMPRESSED (SIZE OF CHUNK 2) | |

METHODS AND DEVICES FOR REDUCING COMPRESSED PAGE LOADING TIME ON PAGE FAULT

TECHNICAL FIELD

The present invention relates generally to memory management associated with mass storage devices and, more particularly, to reducing compressed page loading time from such mass storage devices.

BACKGROUND

Memory of an electronic device (also known as random access memory or RAM) is divided into memory pages, which is the smallest unit of mapping of virtual to physical memory. Such memory pages are also called MMU (Memory Management Unit) pages, as they are managed by an MMU, or more generally as virtual pages. The principle of paging involves loading pages from mass storage (embedded flash memory, e.g., NAND) to RAM only when the code/data in these pages are needed. This avoids having to load, at boot time (start up or power up) of the device, code that is rarely used, thus freeing more RAM for execution of code which is used more frequently for other functions. For paging purposes, a paging buffer (also known as a swap memory or swap buffer in RAM) is allocated, which contains the most recently loaded paged areas. When code located at a memory address in paged memory is invoked, and the corresponding page is not in the paging buffer, a page fault occurs, which triggers the loading of the page from mass storage (flash) to the paging buffer in RAM. When the page is loaded into RAM, the code can then be accessed by the device's processor.

In order to save space in mass storage devices, manufacturers would like to compress the code that is to be stored therein. The code which is stored in the mass storage device is typically organized in two different ways. More specifically, the portion of the code that is loaded by the device at boot up time is called as non-paged code and the portion of the code which is not loaded at boot up time, i.e., which is instead loaded on demand when a page fault occurs, is called paged code. For non-paged code that must be loaded into RAM at boot up time, the loading to RAM is relatively straightforward as will now be described with respect to FIGS. 1(a) and 1(b).

Non-paged code may be stored in a mass storage device, like a flash memory, in either an uncompressed or compressed manner. If uncompressed, the boot code of the device reads the non-paged code in a page-wise manner and copies each page into RAM. If compressed, the non-paged code is typically reduced into small, pre-defined chunks of data, e.g., each MMU page 100 is compressed into a corresponding 8 k sized chunk 102 as shown in FIG. 1(a). It will be appreciated that the 8 k chunk size used in this example is purely illustrative and that the chunk size can vary, e.g., based on the temporary buffer size which is available for use in decompression. As seen in FIG. 1(b), the reading of non-paged code includes reading a compressed chunk from mass storage 103 by, for example, issuing a Direct Memory Access (DMA) request 104. After reading the chunk to temporary buffer 106, a decompression algorithm is executed on the chunk by a central processing unit (CPU) 108 and the decompressed, MMU page(s) 100 are then stored in RAM 110. If the mass storage read access time for a chunk is n milliseconds and decompression time is m milliseconds (ms), then the time taken to read and decompress a chunk of data from mass storage 103 is n+m ms. The total time to decompress non-paged code with p chunks is p*(n+m)ms.

Another way to decompress the compressed non-paged code is to parallelize reading and decompression by using two buffers 106, i.e., one buffer used for reading the compressed chunk and while another compressed chunk in the other buffer is being decompressed, and then switching operations (reading/decompressing) between the two buffers in an alternating cycle. This parallelization speeds up the decompression of the non-paged code. However the speed improvement provided by parallelization is not often critical to the device's overall performance because, for example, the non-paged code is compressed in large, fixed size chunks such that a complete chunk has to be read to start decompression and the boot up time period is not considered to be as time sensitive as device operations which are performed once the device is "ready to go" and being used.

By way of contrast, speeding up the loading of paged code is more important since, while the page loading is occurring, some of the device's operating system cannot schedule other tasks and, for some devices, interrupts are disabled during the loading of paged code from the mass storage device. Since the available RAM memory of the device is limited, required pages are only loaded to the paging buffer on demand. If a page is not available in the physical address space, a page fault is issued. When a page fault occurs, the compressed page has to be identified by the paging or memory manager, decompressed and copied to RAM. The page fault should be serviced with minimal possible latency to meet the real time deadlines of the device's other ongoing processes.

Another consideration in the loading of paged code is that, in the same way that the RAM is divided into individually accessible MMU pages, the mass storage device is divided into individually accessible mass storage pages (e.g., NAND pages) which may have a different size than the MMU pages. Thus, it is desirable that, for MMU pages which are subdivided prior to storage, the subparts of an MMU page are computed in a way such that the compressed MMU pages fit into a fixed number of mass storage pages in order to limit the number of read accesses to mass storage and thereby reduce the latency of loading a page.

According to one known solution for addressing this problem, each MMU page is also compressed into one chunk. Then, the resulting chunks are placed relative to the mass memory storage pages, such that each compressed chunk is either completely stored inside one mass storage page boundary or can cross at most one mass storage page boundary to ensure that the number of read accesses used to acquire an uncompressed MMU page is the same as the number of read accesses used to acquire a compressed MMU page.

However, these known solutions do not enable, for example, parallelized reading and decompressing of data chunks since some or all of the stored data chunks cross mass storage memory pages, and an entire chunk needs to be acquired in order to start the decompression process. Accordingly, exemplary embodiments seek to overcome one or more of the problems as set forth above by providing new methods and systems for handling compressed page loading.

SUMMARY

The inventors have realized that it is possible to recover desired compressed (or uncompressed) paged code given only its location in the mass storage device. The inventors have furthermore found a method for doing this. This method requires a minimal number of accesses to the mass storage device, and it does not add significant latency to page fault handling.

Exemplary embodiments provide, among other benefits and advantages, techniques for compressing, storing, retrieving and decompressing paged code from mass storage devices. By evaluating the size of compressed virtual pages relative to the storage page (read unit) of the mass storage device into which the compressed virtual pages are to be stored, decisions can be made which facilitate later read out and decompression of those compressed virtual pages. According to exemplary embodiments, a virtual page can be stored uncompressed, compressed but undivided or compressed and subdivided into a plurality of parts based on an evaluation.

According to an exemplary embodiment, a method for storing paged code having a plurality of virtual pages in a mass storage device includes the steps of compressing each virtual page to generate a compressed virtual page having a compressed size, evaluating the compressed size of each of the compressed virtual pages relative to a page size of the mass storage device, determining, based on the step of evaluating and for each virtual page, whether to store a respective virtual page as uncompressed, compressed but without subdividing, or subdivided and compressed subparts, and storing each virtual page based on the determining in the mass storage device.

According to an embodiment, a method for storing code having a plurality of virtual pages in a mass storage device includes compressing each virtual page to generate a corresponding compressed virtual page having corresponding compressed size, evaluating compressed sizes of each of the compressed virtual pages relative to a page size of the mass storage device, and storing each of the virtual pages in the mass storage device uncompressed, compressed but without subdividing, or subdivided with compressed subparts, based on at least one of: an uncompressed size of the respective virtual page and a compressed size of the respective virtual page.

According to another exemplary embodiment, a mass storage device having stored therein a plurality of virtual pages in a plurality of mass storage device pages includes the plurality of mass storage device pages, at least one uncompressed virtual page stored in one or more of the plurality of mass storage device pages, at least one compressed, undivided virtual page stored in one of the plurality of mass storage device pages, and at least one compressed, subdivided virtual page stored as at least two compressed subparts in different ones of said plurality of mass storage device pages.

According to another exemplary embodiment, a method for retrieving paged code having a plurality of virtual pages from a mass storage device includes the steps of retrieving, for a subdivided virtual page, a first compressed subpart of the subdivided virtual page from a first mass storage device page, decompressing the first compressed subpart, retrieving, in parallel with the decompressing of the first compressed subpart, a second compressed subpart of the subdivided virtual page, decompressing the second compressed subpart, appending the decompressed first subpart to the decompressed second subpart to reconstruct the subdivided virtual page, and storing the subdivided virtual page in a random access memory (RAM).

According to another exemplary embodiment, an electronic device includes a first memory interface configured to connect at least one mass storage device, a second memory interface configured to connect at least one random access memory (RAM), a processor configured to execute a memory management function which handles a page fault by retrieving virtual pages associated with a binary file in response to the page fault from said at least one flash memory device when the at least one flash memory device is connected to the memory interface, wherein the memory management function is configured to retrieve, for a subdivided virtual page, a first compressed subpart of the subdivided virtual page from a first mass storage device page in the at least one mass storage device, to decompress the first compressed subpart, to retrieve, in parallel with the reading, a second compressed subpart of the subdivided virtual page, to decompress the second compressed subpart, to append the decompressed first subpart to the decompressed second subpart to reconstruct the subdivided virtual page, and to store the subdivided virtual page in the RAM when the RAM is connected to the second memory interface.

BRIEF DESCRIPTION OF THE DRAWINGS

The features of the present invention will be exemplified in the following description and the accompanying drawing, wherein:

FIG. 5($b$) is a graphical depiction of evaluation, compression, reordering and storing of paged code according to another exemplary embodiment;

FIG. 6 shows a mapping table according to an exemplary embodiment;

DETAILED DESCRIPTION

The following detailed description of the exemplary embodiments refers to the accompanying drawings. The same reference numbers in different drawings identify the same or similar elements. Also, the following detailed description does not limit the invention. The scope of the invention remains defined by the appended claims.

Exemplary embodiments provide various methods and systems for improving loading of paged code from a mass storage device. According to one exemplary embodiment, the data of paged partitions is compressed in such a way that reading the compressed data necessary to retrieve the data of an uncompressed MMU (virtual) page does not require more mass storage accesses than if the MMU page was not compressed (with the MMU pages borders aligned on storage pages and the decompression is done with minimal latency. Generally, exemplary embodiments provide for at least some paged code data to be divided into parts prior to compression and storage and to be read in parts to, for example, increase the parallelism of reading and decompression of the data for time critical data processing.

More specifically, exemplary embodiments compress each MMU page separately according to various rules. For example, if an MMU page is compressible to a size which is less than one mass storage page, then the MMU page is compressed as a single chunk of data and stored within a single mass storage page. Alternatively, if an MMU page cannot be compressed into a single mass storage page, then the MMU page is split into multiple chunks each of which are compressed separately. During decompression, these multiple compressed chunks can be read out from the mass storage device in parallel with decompression. A mapping table can be provided, e.g., for each binary file stored as paged code, which is usable by the memory manager to retrieve the correct chunk(s) given the address of an MMU page to be loaded into RAM.

Figure 1A:
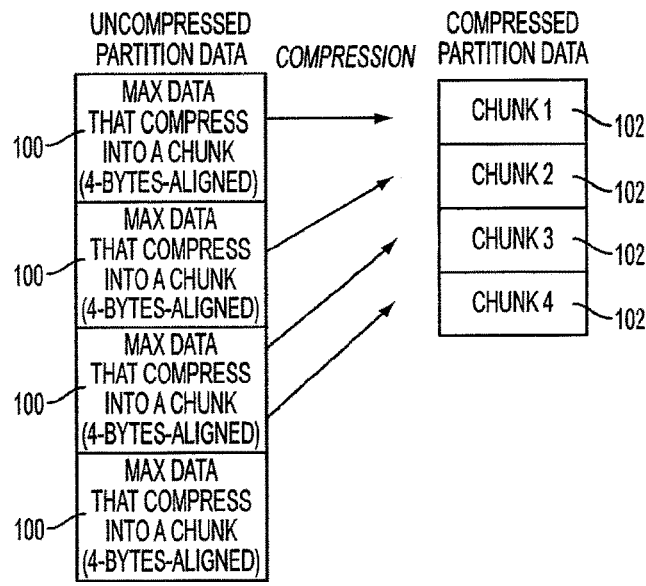
FIGS. 1($a$) and 1($b$) illustrate compression and decompression of non-paged code.
Figure 1B:
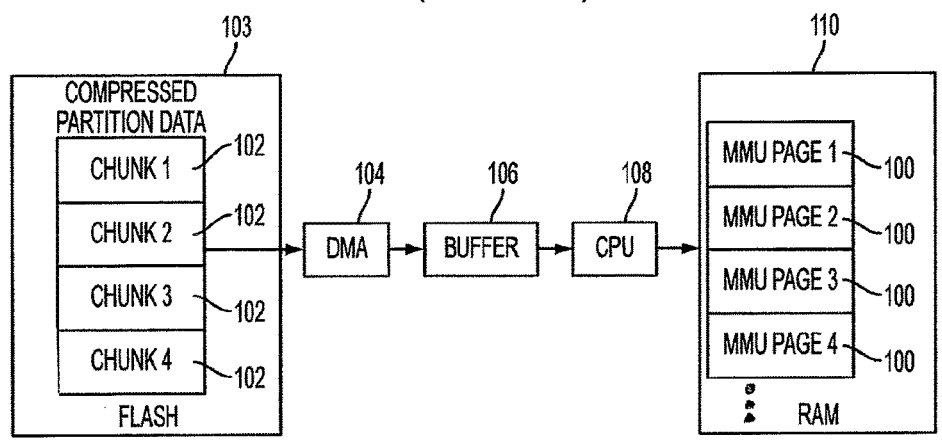
Figure 2:
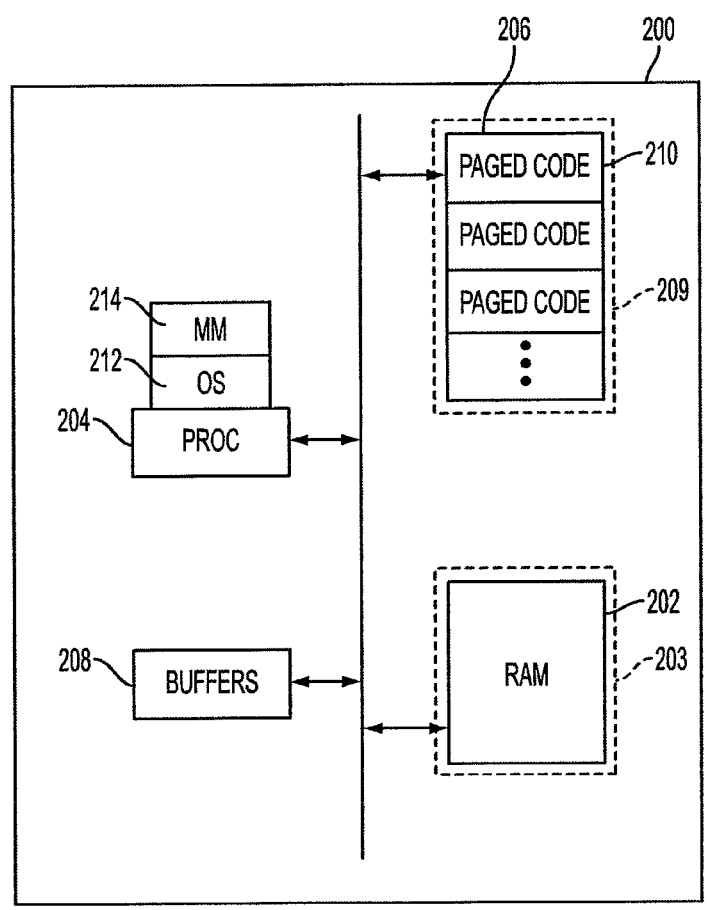
FIG. 2 depicts an electronic device in which paged code can be retrieved and decompressed according to an exemplary embodiment.

These embodiments, and others, will be described below in more detail. Initially, however, it will be useful to provide the reader with some context regarding an exemplary device within which the paged code according to exemplary embodiments can, initially, be stored in a mass storage device and, subsequently, be loaded into RAM during operation. Referring now to FIG. 2, a device 200, e.g., a mobile phone, computer, PDA, or the like, includes a RAM memory 202, a processor 204, a mass storage device (e.g., a flash memory) 206, and a plurality of buffers 208. The RAM memory 202 and the mass storage device 206 can be connected to the electronic device 200 via respective memory interfaces 203 and 209, e.g., chip sockets, which are configured to receive those memory devices.

The mass storage device 206 has stored therein, for example, paged code stored in mass storage device (MSD) pages 210 which is associated with one or more binary files which can be executed on processor 204, which paged code is, at least in part, compressed (e.g., at the factory wherein the mass storage device is either manufactured or where it is pre-loaded with the software code that is to be loaded in the device 200 post boot-up). The device 200 will typically have an operating system 212 running on processor 204, along with one or more applications or tasks, one of which can be a memory management unit (MMU) 214 which operates to coordinate accesses to, e.g., RAM 202 and mass storage device 210. As will be described below, exemplary embodiments include the mass storage device 206 independently (i.e., prior to being connected to device 200 via memory interface 209) having paged code stored therein in the manner to be described in more detail below, as well as the entire device 200 and methods associated therewith.

According to exemplary embodiments the manner in which MMU pages are compressed and ordered for storage in the mass storage device 206 is intended to achieve certain objectives. For example, MMU pages that are compressed to less than one mass storage page size should preferably stored in mass storage device 206 so that, during operation, such MMU pages can be accessed in a single access to mass storage device 206. Since this does not require more than one access to mass storage device 206 relative to the case when MMU pages are not compressed, this feature can save significant time in loading the MMU pages even with the cost of decompression. Additionally, for MMU pages that are compressed to more than the size of one mass storage page associated with mass storage device 206, the read accesses to mass storage pages can be parallelized with decompression according to exemplary embodiments in order to reduce the combined latency of page load and decompression.

Figure 3:
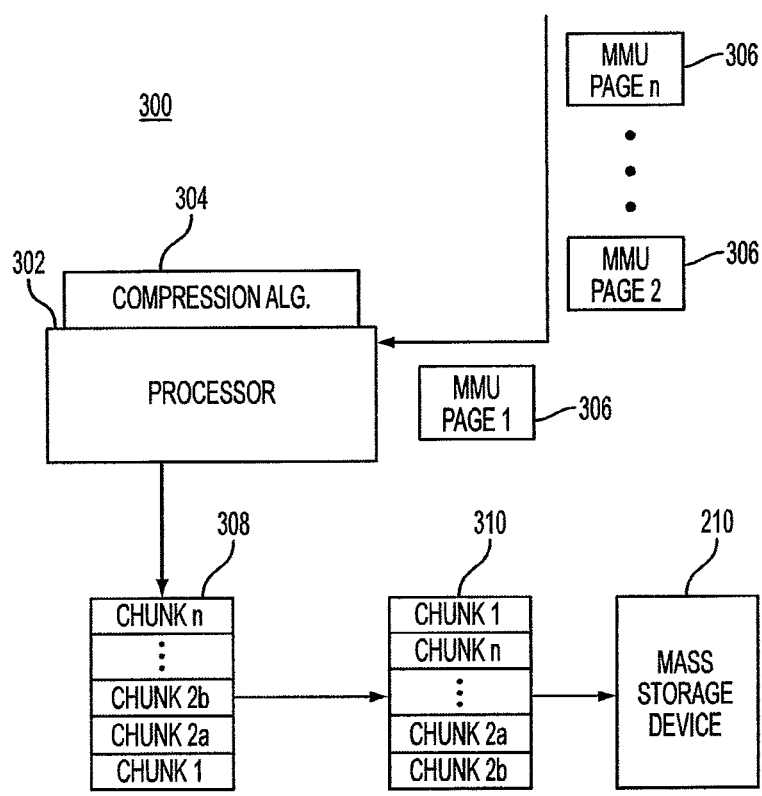
FIG. 3 depicts a system for evaluating, compressing and storing paged code into a mass storage device according to an exemplary embodiment.

Prior to being connected to the device 200, the mass storage device 206 is loaded with the paged code, e.g., at a manufacturing facility or at a distribution facility where empty mass storage devices are loaded, or possibly at the manufacturing facility where the device 200 is put together. Regardless of the location, exemplary embodiments also provide for a mechanism which loads the paged code into the mass storage device 206 to achieve the aforedescribed (and other) objectives. For example, a mass storage device loading mechanism 300 can include the elements illustrated in FIG. 3. Therein, a processor 302 which is running a compression algorithm 304 receives a sequence of MMU pages 306 associated with, for example, a binary file that is to be stored as paged code on the mass storage device 206. Each MMU page 306 is first compressed by algorithm 304, and then evaluated by the processor 302 to determine how it should be stored in the mass storage device 206. As described below in more detail, this evaluation involves first making a decision about how each MMU page 306 will be stored in one or more chunks (as conceptually represented by buffer 308), and then by re-ordering those chunks into a final storage pattern (as conceptually represented by buffer 310) for storage in MSD pages 206 in MSD 210. It will be appreciated that the particular method and system represented by FIG. 3 are purely illustrative and that there may be a number of different ways in which the actual paged code is stored in MSD 206.

Figure 4:
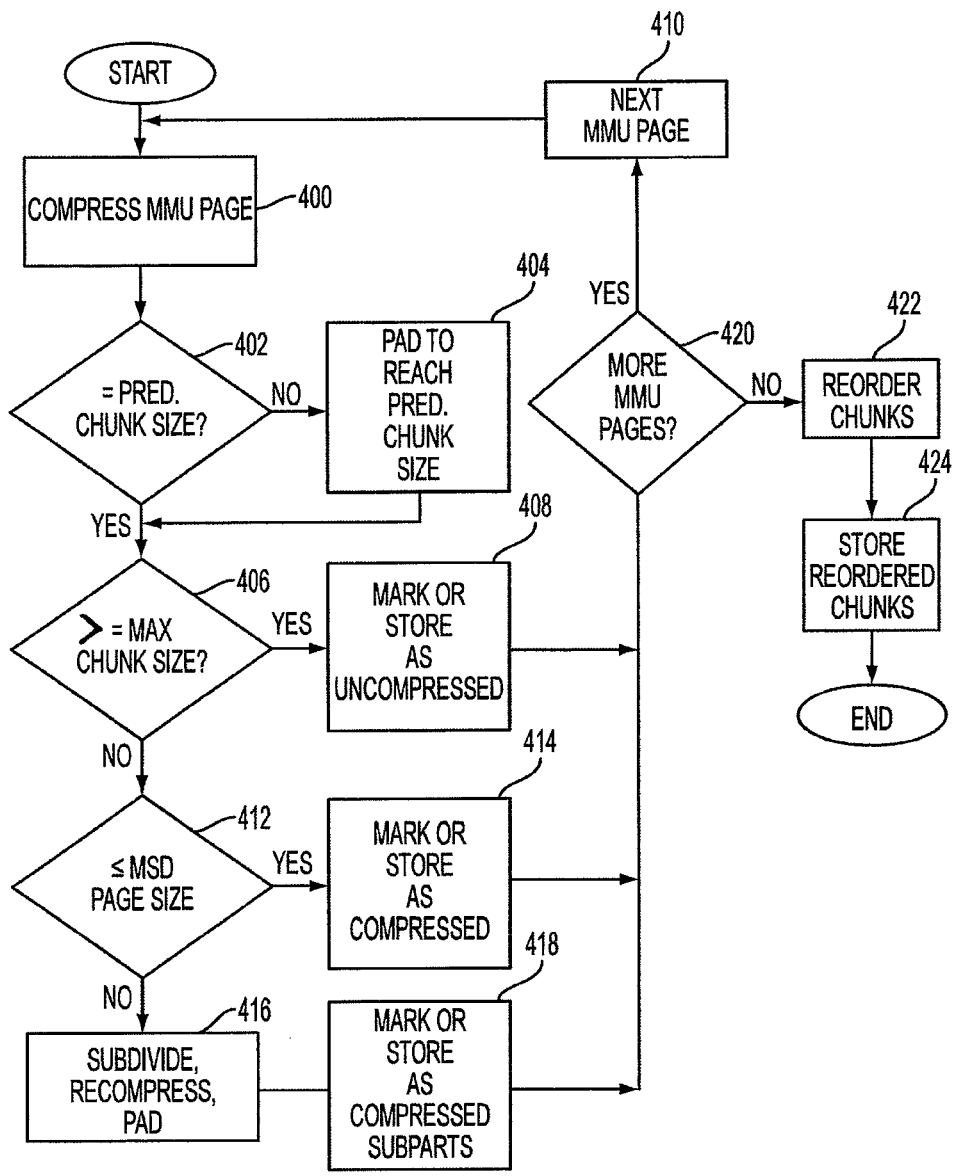
FIG. 4 is a flowchart illustrating a method for evaluating, compressing and storing paged code according to an exemplary embodiment.

The flowchart of FIG. 4 depicts a process for storing paged code in an MSD 206 according to one exemplary embodiment. Initially, each MMU page to be stored in the mass storage device is compressed by running the MMU page through the compression algorithm 304 to determine its compressed size at step 400. The compressed size is then compared (step 402) to a plurality of predetermined chunk sizes which are standardized for use in storing paged code in the mass storage device 206 and, if the compressed size doesn't match one of the predetermined chunk sizes, padding can be added to the compressed size to reach the next highest predetermined chunk size at step 404. Note that although the predetermined chunk sizes will typically be fixed for storing code in a particular MSD 206, that the predetermined chunk sizes may vary as between different MSDs 206 and/or different implementations which have, e.g., different MMU page sizes.

For example, suppose that the MMU page size is 4 kB for a particular device 200 (or RAM 202). The predetermined chunk sizes could, for example, include 4 kB (i.e., uncompressed), 3 kB, 2.5 kB, 2 kB, 1.5 kB, 1 kB, 0.5 kB, although it will be appreciated that such sizes are purely illustrative and will depend upon various implementation parameters. Thus, if the compressed size of an MMU page was 2.7 kB, then 0.3 kB of padding can be added to raise it to the next predetermined chunk size of 3 kB at step 404. The input to block 406 will thus have a size value of one of the plurality of predetermined chunk sizes, which is referred to herein as "the predetermined chunk size associated with the compressed MMU page". Alternatively, embodiments which store code having a plurality of virtual pages in a mass storage device can be implemented without padding.

The predetermined chunk size associated with the compressed MMU page is then compared to a maximum chunk size at step 406. If the predetermined chunk size associated with this compressed MMU page is greater than or equal to the maximum chunk size (which can, for example, be set to the size of an MMU page) then this means that compressing this particular MMU page would not reduce the number of mass storage device read accesses needed to retrieve this MMU page from the mass storage device 206 and, therefore, this MMU page should be stored in mass storage device 206 in an uncompressed form as shown by step 408. Using the exemplary predetermined chunk sizes listed above as illustrative, this would mean that if the compressed MMU page was larger than 3 kB (padded to 4 kB in step 404) it would be stored in buffer 308, and ultimately in the mass storage device 206, in its uncompressed form. As an alternative to step 406, any desired test could be performed to determine whether to store the MMU page being evaluated in its uncompressed form rather than using compression. If it is determined at 420 that there are additional MMU pages, the process flow then continues on to select and to process the next MMU page as indicated by block 410.

Otherwise, if the predetermined chunk size associated with the compressed MMU is less than the maximum chunk size, the processing follows the "No" branch from decision block 406. At step 412, the predetermined chunk size associated with the compressed MMU page is compared with the size of an MSD page. If the compressed size of the MMU page is less than or equal to the size of an MSD page, the flow follows the "Yes" path from the decision block 412 to block 414 wherein the MMU page is stored in its compressed form in buffer 308 (or marked as to be compressed without subdivision), and the process continues on to the next MMU page in the binary file being compressed for storage. Among other things, this enables compressed MMU pages which are the same size (potentially with padding) as an MSD page to be stored in a single MSD page as described below.

Otherwise, if the predetermined chunk size associated with the compressed MMU page is greater than the MSD page size, then according to this exemplary embodiment, the uncompressed MMU page should be subdivided into two separate chunks each of which is independently compressed such that both the compressed chunk sizes are less than the MSD page size. These are then padded to the predefined chunk size and stored, as indicated by following the "No" path to block 416. This enables the two subparts of each of these types of compressed MMU pages to be read out separately and decompressed in parallel, as described in more detail below. As indicated in step 416, the MMU page is subdivided, then each subpart is compressed and, if needed, padded to reach one of the predetermined chunk sizes as described above. The resulting subparts are then stored in buffer 308 (or the MMU page can be marked for processing into subparts) at step 418. As an illustrative example, if a predetermined chunk size associated with a compressed MMU page is 3.0 kB, then the uncompressed MMU page can be split into two subparts, each of which are independently compressed such that the compressed chunks are less than MSD page size and optionally padded to result in subparts having sizes of 2.0 kB and 1.0 kB.

Once all of the MMU pages associated with a given binary file have been processed as described above, the resulting chunks associated with one or more of uncompressed MMU pages, compressed MMU pages and compressed MMU page subparts are, according to this exemplary embodiment, reordered as indicated by block 422. For example, the chunks can be reordered based on their comparative sizes. As a more detailed example, and using the above described example of predefined chunk sizes, the chunks stored in buffer 308 can be reordered into a sequence having first all of the 4 kB chunks, then the 2 kB chunks, then the 1.5 kB chunks, then the 1 kB chunks and then the 0.5 kB chunks to result in a reordered set of chunks as represented by reordered buffer 310 in FIG. 3. The chunks can then be stored in this order in mass storage device 210 as indicated by step 424.

Figure 5A:
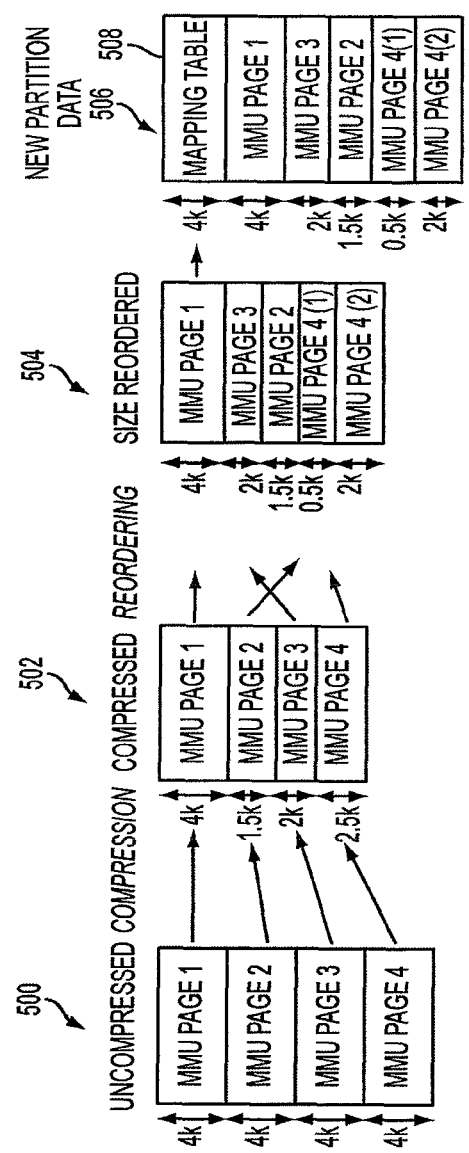
FIG. 5($a$) is a graphical depiction of evaluation, compression, reordering and storing of paged code according to an exemplary embodiment.

A first graphical example of the aforedescribed process is provided as FIG. 5(*a*) to further illustrate the process and the results thereof according to exemplary embodiments. Therein, the MMU page size is again 4 kB, the MSD page size is again 2 kB and the predefined chunk sizes are again 4 kB (i.e., uncompressed), 3 kB, 2.5 kB, 2 kB, 1.5 kB, 1 kB, and 0.5 kB. Moving from left to right in the Figure, consider four MMU pages 1-4 in row 500 each having a size of 4 kB which are to be processed by the system 300 using the process of FIG. 4. In this example, MMU page 1 compresses to a predefined chunk size of 4 kB (i.e., no need to compress this page), MMU page 2 compresses to 1.5 kB, MMU page 3 compresses to 2 kB and MMU page 4 compresses to 2.5 kB. Note that although examples are provided herein of MMU pages which are subdivided into two subparts, which are then separately compressed for storage in MSD 206, that the present invention is not so limited. There may be more than two subparts and, generally, the number of subparts will be based on the relative sizes of the MMU pages to the MSD pages as MMU page size/mass storage device page size.

Using the exemplary decision algorithm described above with respect to FIG. 4, it will thus be apparent that MMU page 1 will thus be stored, uncompressed in two MSD pages, MMU page 2 will be stored compressed and undivided in a single MSD page, MMU page 3 will also be stored compressed and undivided in a single MSD page. Since the MMU page 4 after compression has a size which is greater than the MSD page size, e.g., it would cross an MSD page boundary, the MMU page is split into two and compressed again such that the compressed two chunks are less than one MSD page and there are rounded off to 2 KB and 0.5 KB. The two chunks associated with MMU page 4, referred to in FIG. 5(*a*) as 4(1) and 4(2), will then be compressed and stored as subdivided and compressed parts.

Whereas the chunks in row 502 are disposed in the same order as the MMU pages from which they were derived, these chunks are then reordered based on their size to generate row 504. If compressed chunks in an MSD page do not fill that page, then padding can be added (although not shown in FIG. 5(*a*)). A final set of MSD pages is prepared for storage in the mass storage device 210, as indicated by row 506, wherein the horizontal marks on the right hand side of this row indicates the relative placement of the MSD page boundaries relative to the MMU page chunks which they contain. Thus the uncompressed MMU page 1 spans two MSD pages, the compressed, but not subdivided MMU page 3 spans one MSD page, the compressed and subdivided MMU page 4 has one compressed part 4(2) which takes up an entire MSD page and another part 4(1) which is occupies an MSD page with the compressed but undivided MSD page 2. Also included in row 506 is a mapping table 508 which will subsequently enable an MMU 214 to locate the chunks for later retrieval from an MSD 206, as will be described in more detail below.

Figure 5B:
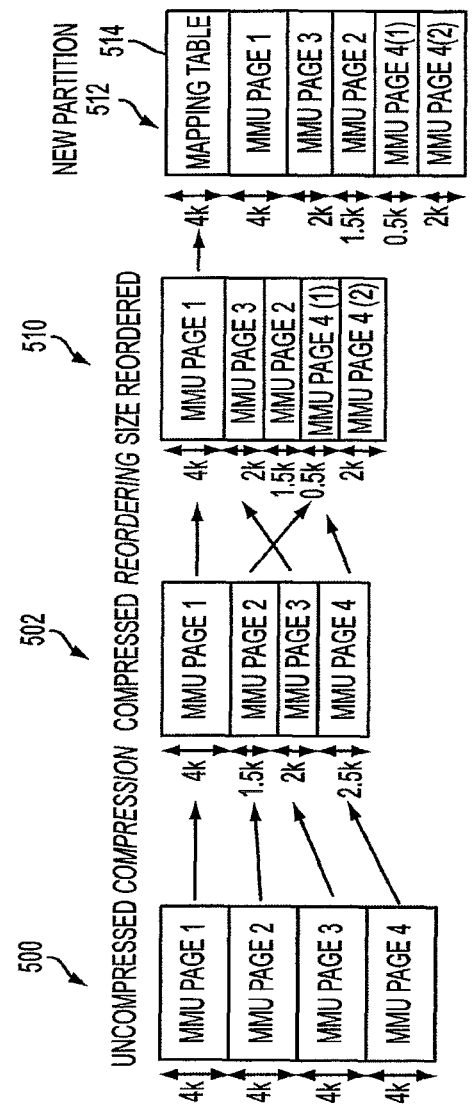

The aforedescribed embodiment of FIG. 5(*a*) provides for reordering of the chunks of data (which are the result of the evaluation process described in FIG. 4 as steps 402-418) based on their respective sizes. However other types of reordering may be performed on the chunks of data in buffer 308 prior to storing them in the mass storage device 206. For example, according to another exemplary embodiment shown in FIG. 5(b), the chunks in buffer 308 can be reordered as follows to ensure that if the compressed page size is less than one storage page size, then ideally only one read access is made. First, put all of the uncompressed chunks at the beginning of the MSD. Thus, as shown in FIG. 5(b), page 1 (which was uncompressed) is placed at the top of row 510.

Second, all of the compressed chunks whose size is less than one MSD storage page (such that no page crosses the MSD page boundary) are placed as follows. If a current offset at which a previous chunk was placed is within MSD storage page N, find the biggest compressed chunk that fits before the beginning of page N+1. For example, the compressed chunks for MMU page 2 and MMU page 3 in row 502 compressed to 1.5 k and 2 k, respectively. The 2 k chunk can be placed first in its own MSD page. If there is no such chunk, add padding bytes from the offset until the end of page N, and then store the largest compressed chunk which remains at the beginning of page N+1 and repeat these steps.

After processing the uncompressed chunks, and those chunks whose compressed size is less than one MSD storage page size, the remaining chunks (whose size m is greater than one storage page size n) can be processed as follows. First, divide the MMU page into m/n chunks, then compress the first chunk to the space left in page N, and finally compress the remaining chunks in order of size n, n-1 . . . 2, 1, ½, ⅓, ¼. An example of this last step can be seen in FIG. 5(b), row 510, where the 2.5 k compressed chunk generated by MMU page 4 is divided into two chunks where a 0.5 k chunk is taken from the 2.5 k chunk to complement the 1.5 k chunk placed in the last MSD page, with the remaining 2 k occupying the last (bottommost) MSD page in row 510. A final set of MSD pages is prepared for storage in the mass storage device 210, as indicated by row 512, which includes a mapping table 514.

An implementation can choose not to pad the individual compressed chunks to predefined chunk sizes. During reordering step 422, for each MSD page a greedy approach is taken as explained in 0046 to fit in as many compressed chunk as possible and pad out the rest till the MSD page size Regardless of the particular reordering scheme which is used, in order to locate the corresponding pages in the compressed layout according to exemplary embodiments, a mapping table is built. According to an exemplary embodiment, the first entry of the mapping table contains the total number of MMU pages in the partition binary, followed by page details of compressed pages in a sequence, e.g., their location and chunk sizes. For a storage page size s, and MMU page size m (m>s), the page detail entry contains m/s entries for storing the offset of compressed chunks and m/s entries for storing the sizes of compressed chunks. An example of such a mapping table 600 is provided as FIG. 6. However, it will be appreciated by those skilled in the art that the mapping table 600 can take any desired format, and can contain any desired information, which will enable MMU 214 to be able to extract, decompress and reassemble the various chunks of paged code stored therein.

Figure 7:
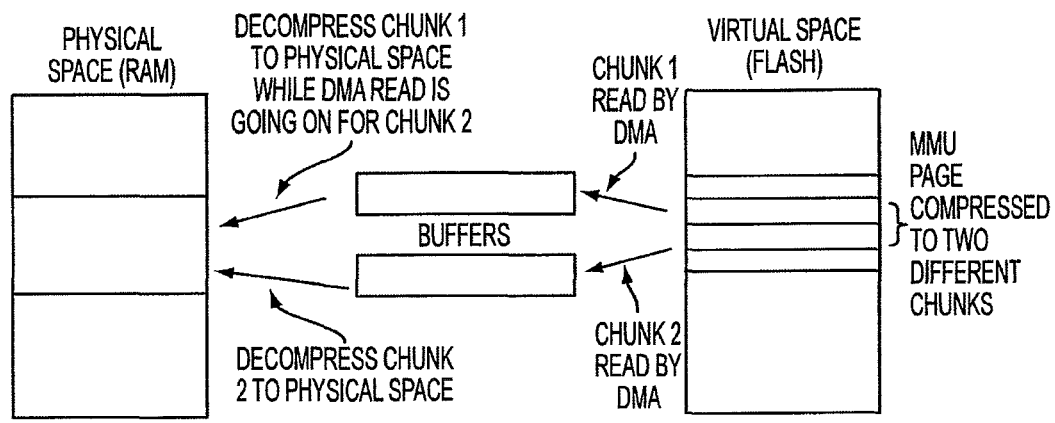
FIG. 7 illustrates retrieval and decompression of two compressed subparts or chunks of a virtual page according to an exemplary embodiment.

According to exemplary embodiments, paged code which is compressed and subdivided as described above for storage into an MSD 206 can be accessed (read) by a device 200 as shown in FIG. 7. After identifying the desired, compressed MMU page in the storage space, i.e., by reading mapping table 600, a DMA read access is issued to read the first compressed chunk associated with that MMU page. The first chunk can be read into a buffer. After reading the first chunk, a decompression algorithm (which operates in a reverse fashion to compression algorithm 304), decompresses the first chunk. During that same time, while the first chunk is being decompressed, another DMA read access is issued by processor 204 (or DMA unit) for the second compressed chunk associated with the same MMU page as the first chunk, again using information from the mapping table 600. This second chunk can be read into another buffer, and then can be decompressed and aggregated with the decompressed first chunk to form a reconstituted MMU page which is stored in, e.g., RAM 202.

The foregoing exemplary embodiments provide for the evaluation and compression of paged code into a mass storage device, as well as the retrieval and decompression of that paged code from the mass storage device. Among other advantages, exemplary embodiments provide for an optimal way of loading a required page and do not yield an overhead of page load and decompression in a manner which decreases latency associated with page fault handling and improves real time performance of the paged code retrieval process.

Figure 8:
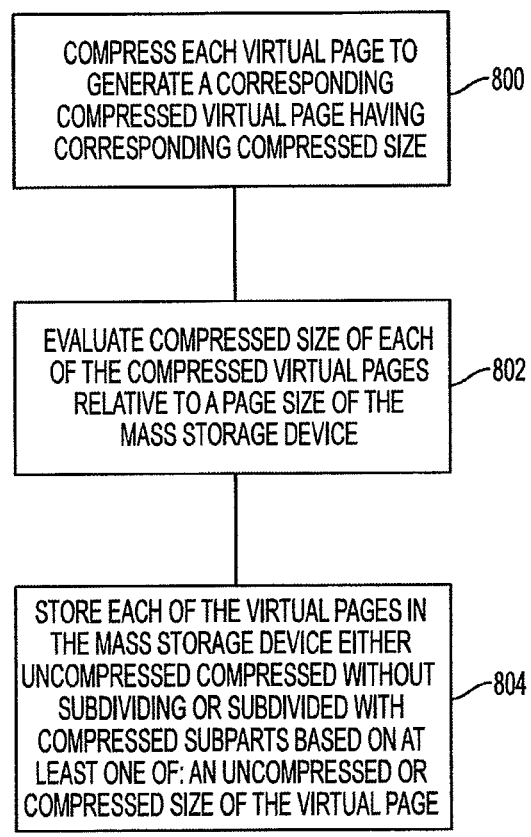
FIG. 8 is a flowchart illustrating a method for storing paged code having a plurality of virtual pages in a mass storage device.

According to one exemplary embodiment, a method for storing paged, code having a plurality of virtual pages, in a mass storage device includes the steps illustrated in the flowchart of FIG. 8. Therein, at step 800, a virtual page is compressed to generate a compressed virtual page having a compressed size. The compressed size of the compressed virtual pages is evaluated, at step 802, relative to a page size of said mass storage device. Based on the step of evaluating, the virtual page is stored as uncompressed, compressed but without subdividing, or subdivided and compressed subparts based on either it uncompressed or compressed size.

Figure 9:
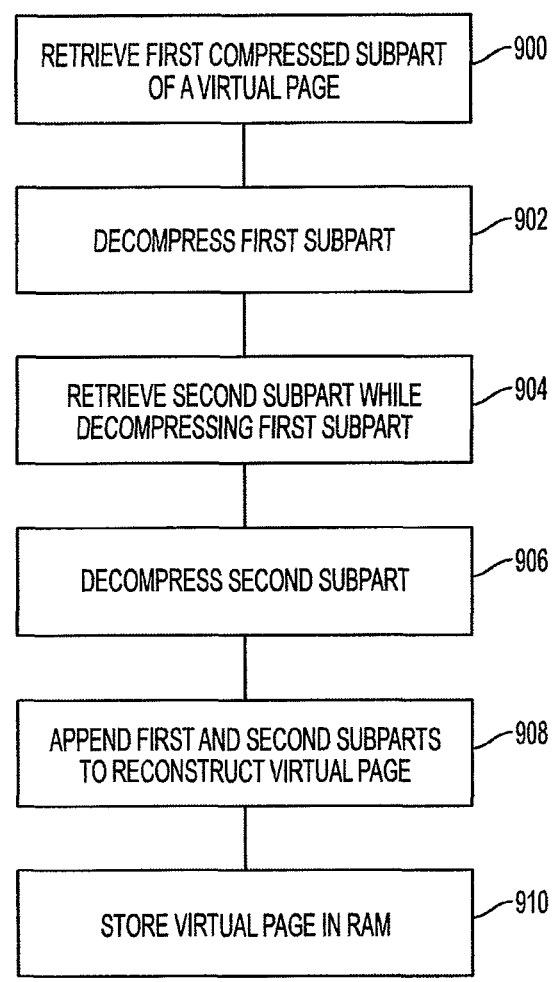
FIG. 9 is a flowchart illustrating a method for retrieving paged code having a plurality of virtual pages from a mass storage device.

A method for retrieving paged code having a plurality of virtual pages from a mass storage device according to an exemplary embodiment is shown in the flowchart of FIG. 9. Therein, at step 900, a first compressed subpart of a subdivided virtual page is retrieved from the mass storage device. This first compressed subpart is decompressed at step 902. In parallel with this decompressing step, a second compressed subpart, associated with the same subdivided virtual page, is retrieved from the mass storage device at step 904. The second compressed subpart is decompressed at step 906, and then appended to the decompressed first subpart at step 908 to reconstruct the virtual page. The reconstructed virtual page is then stored in RAM at step 910.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for storing a plurality of virtual pages in a mass storage device, the method comprising:
compressing each virtual page to generate a corresponding compressed virtual page having a corresponding compressed size;
evaluating said compressed size of each of said compressed virtual pages relative to a page size of said mass storage device; and selectively storing each of the plurality of virtual pages in said mass storage device uncompressed, compressed but without subdividing, or subdivided with compressed subparts, in a manner that is based on at least one of: an uncompressed size of the respective virtual page and said compressed size of the respective virtual page, selected based on said evaluating, wherein, for each one of the plurality of virtual pages that is stored in said mass storage device subdivided with compressed subparts, said storing comprises:

concluding that said compressed size of the one of the plurality of virtual pages will not fit within one page of said mass storage device;

in response to said concluding, dividing the one of the plurality of virtual pages into a plurality of subdivided uncompressed parts of the one of the plurality of virtual pages;

independently performing said compressing, said evaluating, and said selectively storing for each of said plurality of subdivided uncompressed parts of the one of the plurality of virtual pages.

2. The method of claim 1, further comprising:

padding one of said compressed virtual pages, if needed, to reach a next highest predefined chunk size relative to said compressed size of the one of said compressed virtual pages, to generate a compressed virtual page at said next highest predefined chunk size.

3. The method of claim 1, further comprising:

storing one or more of the compressed virtual pages in a page of said mass storage device, said compressed virtual pages fitting within said page of said mass storage device, and padding a remaining storage space in said page of said mass storage device.

4. The method of claim 1, wherein said storing further comprises:

storing, as uncompressed, said compressed virtual pages for which said corresponding compressed size is equal to said page size of said mass storage device.

5. The method of claim 1, wherein said storing further comprises:

storing, as compressed but without subdividing, said compressed virtual pages for which said corresponding compressed size is less than or equal to said page size of said mass storage device.

6. The method of claim 1, further comprising:

storing, in compressed subparts, said compressed virtual pages for which said corresponding compressed size is greater than said page size of said mass storage device.

7. The method of claim 1, further comprising:

reordering, prior to storing, said uncompressed virtual pages, said compressed virtual pages and said compressed subparts of said virtual pages based on the uncompressed size of the uncompressed virtual pages and the compressed size of the compressed virtual pages and the compressed subparts of said virtual pages.

8. The method of claim 1, further comprising:

storing, in said mass storage device, a mapping table which includes information regarding where said uncompressed virtual pages, said compressed virtual pages and said compressed subparts of said virtual pages are stored in said mass storage device.

9. An electronic device comprising:

a first memory interface configured to connect at least one mass storage device, a second memory interface configured to connect at least one random access memory (RAM);

a processor configured to execute a memory management function, the memory management function comprising storing a plurality of virtual pages into the at least one mass storage device when said at least one mass storage device is connected to the first memory interface, wherein said memory management function is configured to: compress each virtual page to generate a corresponding compressed virtual page having a corresponding compressed size;

evaluate said compressed size of each of said compressed virtual pages relative to a page size of said mass storage device; and selectively store each of the plurality of virtual pages in said mass storage device uncompressed, compressed but without subdividing, or subdivided with compressed subparts, in a manner that is based on at least one of: an uncompressed size of the respective virtual page and said compressed size of the respective virtual page, selected based on said evaluating, wherein, for each one of the plurality of virtual pages that is stored in said mass storage device subdivided with compressed subparts, said storing comprises:

concluding that said compressed size of the one of the plurality of virtual pages will not fit within one page of said mass storage device;

in response to said concluding, dividing the one of the plurality of virtual pages into a plurality of subdivided uncompressed parts of the one of the plurality of virtual pages;

independently performing said compressing, said evaluating, and said selectively storing for each of said plurality of subdivided uncompressed parts of the one of the plurality of virtual pages.

10. The electronic device of claim 9, wherein said memory management function is further configured to:

pad one of said compressed virtual pages, if needed, to reach a next highest predefined chunk size relative to said compressed size of the one of said compressed virtual pages, to generate a compressed virtual page at said next highest predefined chunk size.

11. The electronic device of claim 9, wherein said memory management function is further configured to:

store one or more of the compressed virtual pages in a page of said mass storage device, said compressed virtual pages fitting within said page of said mass storage device, and pad a remaining storage space in said page of said mass storage device.

12. The electronic device of claim 9, wherein said storing further comprises:

storing, as uncompressed, said compressed virtual pages for which said corresponding compressed size is equal to said page size of said mass storage device.

13. The electronic device of claim 9, wherein said storing further comprises:

storing, as compressed but without subdividing, said compressed virtual pages for which said corresponding compressed size is less than or equal to said page size of said mass storage device.

14. The electronic device of claim 9, wherein said memory management function is further configured to:

store, in compressed subparts, said compressed virtual pages for which said corresponding compressed size is greater than said page size of said mass storage device.

15. The electronic device of claim 9, wherein said memory management function is further configured to:
reorder, prior to storing, said uncompressed virtual pages, said compressed virtual pages and said compressed subparts of said virtual pages based on the uncompressed size of the uncompressed virtual pages and the compressed size of the compressed virtual pages and the compressed subparts of said virtual pages.

16. The electronic device of claim 9, wherein said memory management function is further configured to:
store, in said mass storage device, a mapping table which includes information regarding where said uncompressed virtual pages, said compressed virtual pages and said compressed subparts of said virtual pages are stored in said mass storage device.

* * * * *